(12) United States Patent
Sizer et al.

(10) Patent No.: US 8,943,608 B2
(45) Date of Patent: *Jan. 27, 2015

(54) DOCUMENT SERVER AND CLIENT DEVICE DOCUMENT VIEWER AND EDITOR

(71) Applicant: WebFilings LLC, Ames, IA (US)

(72) Inventors: Shane K. Sizer, Bozeman, MT (US); Graham I. Cummins, Livingston, MT (US); Bert Jeffrey Lutzenberger, Bozeman, MT (US); Gary D. Orser, Bozeman, MT (US); Benjamin P. Echols, Bozeman, MT (US); Jeffrey D. Trom, Bozeman, MT (US)

(73) Assignee: Workiva LLC, Ames, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/945,655

(22) Filed: Jul. 18, 2013

(65) Prior Publication Data

US 2014/0245458 A1 Aug. 28, 2014

Related U.S. Application Data

(63) Continuation of application No. 13/779,023, filed on Feb. 27, 2013, now Pat. No. 8,504,827.

(51) Int. Cl.
*H04L 29/06* (2006.01)
*G06F 17/30* (2006.01)
(Continued)

(52) U.S. Cl.
CPC ...... *G06F 17/30011* (2013.01); *G06F 21/6218* (2013.01); *G06F 21/6227* (2013.01); *G06F 21/60* (2013.01)
USPC .......................................................... 726/27

(58) Field of Classification Search
CPC ... G06F 21/10; G06F 21/605; G06F 21/6218; G06F 17/30011
USPC .......................................................... 726/27
See application file for complete search history.

(56) References Cited

U.S. PATENT DOCUMENTS 4,972,496 A 11/1990 Sklarew
5,051,930 A * 9/1991 Kuwabara et al. ............ 715/207
(Continued)

OTHER PUBLICATIONS

International Search Report and Written Opinion issued in related application PCT/US2013/054198, dated Feb. 21, 2014, 10 pages.
(Continued)

*Primary Examiner* — Michael S McNally
(74) *Attorney, Agent, or Firm* — Drinker Biddle & Reath LLP

(57) ABSTRACT

A method of storing a document on a server, including: extracting document content from a document stored on the server, using a processor on the server; dividing the document content into a plurality of document content sections; generating a parallel data structure for the plurality of document content sections based on a viewing size, where the parallel data structure includes a plurality of selectors, and the plurality of selectors includes pagination selectors; and storing the plurality of document content sections in a plurality of locations on the server. The method may further include storing the parallel data structure in a location on the server separate the plurality of document content sections; generating a table of contents based on the pagination; and rendering the plurality of document content sections into a plurality of document pages based on the plurality of selectors in the parallel data structure.

23 Claims, 11 Drawing Sheets

(51) Int. Cl.
*G06F 21/60* (2013.01)
*G06F 21/62* (2013.01)

(56) References Cited

U.S. PATENT DOCUMENTS

| | | | |
|---|---|---|---|
| 5,502,803 A | 3/1996 | Yoshida et al. | |
| 5,802,299 A * | 9/1998 | Logan et al. | 709/218 |
| 5,892,587 A * | 4/1999 | Okada et al. | 358/402 |
| 6,040,920 A * | 3/2000 | Ichiriki | 358/403 |
| 6,185,590 B1 | 2/2001 | Klein | |
| 6,560,620 B1 | 5/2003 | Ching | |
| 6,598,161 B1 * | 7/2003 | Kluttz et al. | 713/166 |
| 6,762,776 B2 | 7/2004 | Huapaya | |
| 2003/0079183 A1 | 4/2003 | Tada et al. | |
| 2004/0056890 A1 | 3/2004 | Hao et al. | |
| 2004/0181688 A1* | 9/2004 | Wittkotter | 713/201 |
| 2005/0055635 A1 | 3/2005 | Bargeron et al. | |
| 2005/0188005 A1* | 8/2005 | Tune | 709/203 |
| 2005/0223008 A1* | 10/2005 | Kubota et al. | 707/9 |
| 2006/0031411 A1 | 2/2006 | Gimson et al. | |
| 2007/0061415 A1 | 3/2007 | Emmett et al. | |
| 2007/0276836 A1 | 11/2007 | Chatterjee et al. | |
| 2008/0120539 A1 | 5/2008 | Stephens, Jr. | |
| 2008/0168277 A1 | 7/2008 | Forlenza et al. | |
| 2008/0172555 A1 | 7/2008 | Keenan | |
| 2010/0235728 A1* | 9/2010 | Hasuike | 715/255 |
| 2011/0109502 A1 | 5/2011 | Sullivan | |
| 2011/0258043 A1 | 10/2011 | Ailaney et al. | |
| 2012/0047428 A1 | 2/2012 | Nykanen et al. | |
| 2012/0096345 A1 | 4/2012 | Ho et al. | |
| 2012/0117481 A1 | 5/2012 | Stevens et al. | |
| 2012/0173612 A1 | 7/2012 | Vegesna-Venkata et al. | |

OTHER PUBLICATIONS

Perlow, "Office for iPad and Android: Microsoft's Azure Cloud and Thin Client the key?", <http://www.zdnet.com/blog/perlow/office-for-ipad-and-android-microsofts-azure-cloud-and-thin-client-the-key/20544>, Jun. 5, 2012, 3 pages.

* cited by examiner

DOCUMENT SERVER AND CLIENT DEVICE DOCUMENT VIEWER AND EDITOR

CROSS-REFERENCE TO RELATED PATENT APPLICATIONS

This patent application is a continuation of copending U.S. patent application Ser. No. 13/779,023 filed Feb. 27, 2013, which is incorporated herein by reference.

BACKGROUND

1. Field

Various embodiments disclosed herein relate to a system and method for storing a document on a server and for viewing and editing the stored document using a client device, and more specifically to a system and method for dividing the document into document content sections, securely storing the document content sections on the server, and viewing and editing the document content sections on the client device.

2. Related Art

A document typically includes document content and document support data in the form of metadata. Document support data may include pagination data, formatting data, and style data. Pagination data is information that indicates how document content is divided into pages. There are two types of pagination data: hard page breaks, which are forced page breaks in the document, and soft page breaks, which are content-based page breaks. Style and formatting data are information that determines how the document content looks or appears when displayed on a screen or printed on paper. For example, style and formatting data may include information regarding whether text content is in bold, italicized, or underlined.

Conventional systems for storing, viewing, and editing a document in a client-server architecture typically include a server and a thin client device. The server stores the document as a document file in a database and provides processing power on behalf of the thin client device. The document file includes document content data, pagination data, formatting data, and style data. All the information is stored together in the document file so that the server can properly render the document for viewing or editing on the thin client device.

To view or edit a document file stored on the server in the conventional systems, a user typically uses a web browser or a document viewer program installed on the thin client device. The thin client device displays the accessed document file and accepts editing requests from the user. The thin client device then transmits the editing requests to the server. In turn, the server processes the received editing requests and re-renders the entire document file.

Furthermore, when the user is viewing or editing the document file on the thin client device, the thin client device must be connected to the server via a communication link. If the thin client device is not connected to the server, then the entire document file must be downloaded onto the thin client device at an earlier time so that the user can view or edit the document file while the thin client device is offline.

These conventional systems can be inefficient for several reasons. First, since the document content and document support data are all stored in the same document file, when a document file is edited on the thin client device, the entire document file must be re-rendered on the server. For a large document file (e.g., hundreds or thousands of pages), it would take the server a substantial amount of time to re-render the entire document file. Second, if the user wants to view or edit only a portion of the document file offline, the user cannot download only the portion of interest but must wait for the thin client server to download the entire document file from the server.

Accordingly, it would be advantageous to provide a system that securely stores a document in document content sections on the server and facilitates efficient online and offline viewing and editing of the document content sections on a client device.

SUMMARY

According to an embodiment, a method of storing a document on a server includes: extracting document content from a document stored on the server, using a processor on the server; dividing the document content into a plurality of document content sections; generating a parallel data structure for the plurality of document content sections based on a viewing size, where the parallel data structure includes a plurality of selectors, and the plurality of selectors includes pagination selectors; and storing the plurality of document content sections in a plurality of locations on the server.

The method for storing a document on a server may further include: storing the parallel data structure in a location on the server separate from the plurality of locations in which the plurality of document content sections are stored; generating a table of contents based on the pagination selectors in the parallel data structure, and storing the table of contents on the server; or rendering the plurality of document content sections into a plurality of document pages based on the plurality of selectors in the parallel data structure, and storing the plurality of document pages on the server.

The method may further include encrypting each document content section of the plurality of document content sections prior to the storing of the plurality of document content sections.

The plurality of selectors may further include a selector selected from the group consisting of a format selector, a style selector, a link selector, a line selector, and an annotation selector.

The method may further include receiving a request to remotely access a portion of the document stored on the server, and authenticating the request.

Another embodiment provides a non-transitory computer program product including a computer usable medium having a computer readable code embodied therein, where the computer readable program code is adapted to be executed to implement the method of storing a document on a server.

In yet another embodiment, a method of storing a document on a server for a plurality of viewing sizes includes: extracting document content from a document stored on the server, using a processor on the server; generating a plurality of parallel data structures corresponding to a plurality of viewing sizes, where for each viewing size of the plurality of viewing sizes: dividing the document content into a plurality of document content sections; generating a parallel data structure for the plurality of document content sections based on the viewing size, where the parallel data structure includes a plurality of selectors, and the plurality of selectors includes pagination selectors; and storing the plurality of document content sections in a plurality of locations on the server.

For each viewing size of the plurality of viewing sizes, the method may further include storing the parallel data structure in a location on the server separate from the plurality of locations in which the plurality of document content sections are stored.

For each viewing size, the method may further include: generating a table of contents based on the pagination selectors in the parallel data structure; and storing the table of contents on the server. In addition, the method may further include: rendering the plurality of document content sections into a plurality of document pages based on the plurality of selectors in the parallel data structure; and storing the plurality of document pages on the server.

Furthermore, for each viewing size, the method may further include encrypting each document content section of the plurality of document content sections prior to the storing of the plurality of document content sections.

For each viewing size, the plurality of selectors may further include a selector selected from the group consisting of a format selector, a style selector, a link selector, a line selector, and an annotation selector.

The method of storing a document may further include: receiving a request to remotely access a portion of the document stored on the server; and authenticating the request.

According to an embodiment, a method for viewing and updating a document in a client-server architecture includes: on the server: extracting, using a processor on the server, document content from a document stored on the server; dividing the document content into a plurality of document content sections; generating a parallel data structure for the plurality of document content sections based on a viewing size, where the parallel data structure includes a plurality of selectors, and the plurality of selectors includes pagination selectors; generating a table of contents based on the pagination selectors; storing the table of contents on the server; rendering the plurality of document sections into a plurality of document pages based on the plurality of selectors in the parallel data structure; storing the plurality of document pages in a plurality of locations on the server; requesting, on the client device, to view the document stored on the server; transmitting, from the server to the client device, the table of contents; requesting, on the client device, to view at least one document page of the document based on the table of contents; transmitting, from the server to the client device, only the requested at least one document page and a predetermined number of document pages preceding and following the requested at least one document page; storing, on the client device, the received document pages; and displaying, on the client device, the requested at least one document page.

The method may further include: receiving and storing, on the client device, document editing requests; transmitting, from the client device to the server, the stored document editing requests; updating, on the server, the parallel data structure based on the transmitted document editing requests; and updating, on the server, only the document content section corresponding to the document pages transmitted from the server to the client device, based on the transmitted document editing requests.

Optionally, the updating of the parallel data structure may include modifying only selectors that correspond to the transmitted document editing requests. The transmitting, from the client device to the server, the stored document editing requests may include transmitting the stored document editing requests only when the client device is connected to the server via a communication link.

When a scrolling function is enabled on the client device, the method may further include delaying the request to view the at least one document page of the document for a first predetermined period of time. The at least one document page of the document may be a destination page of the document after the scrolling function is deactivated. The method may further include delaying, on the client device, the request to view the at least one page of document for a second predetermined period of time, when the first predetermined period of time has elapsed and the scrolling function is still activated.

In yet another embodiment, a server for storing a document includes: a memory; and a server processor including: a document content extractor that extracts document content from a document stored in the memory; a parallel data generator that generates a parallel data structure for the document based on a viewing size, where the parallel data structure includes a plurality of selectors, and the plurality of selectors is pagination selectors; and a document content divider that divides the document content into a plurality of document content sections according to the plurality of selectors.

The server processor may further include: a document page renderer that renders the plurality of document content sections into a plurality of document pages according to the plurality of selectors in the parallel data structure; and a table of contents generator that generates a table of contents according to the pagination selectors in the parallel data structure.

BRIEF DESCRIPTION OF THE DRAWINGS

Various embodiments are illustrated in the drawings and following discussion.

DETAILED DESCRIPTION

As described herein, various embodiments of a system and method for storing, viewing, and editing a document include a server and a client device. A method for storing a document on the server includes a Service Side Composition (SSC) process and a page rendering process. During the SSC process, the server extracts the document content from the document, divides the document content into SSC document content sections, and generates a SSC parallel data structure. Each SSC document content sections may be encrypted and separately stored. During the page rendering process, the server generates a table of contents based on the SSC parallel data structure and renders the SSC document content sections into document content pages that can be displayed on a client device.

The client device has installed thereon a document viewer and editor application that provides a user access to the rendered document content pages stored on the server. The document viewer and editor application allows the user to view and edit the requested document content pages. Also, the client device may store edit requests and then transmit the edit requests to the server. Based on the edit requests, the server re-renders only the modified portion of the document content.

Figure 1:
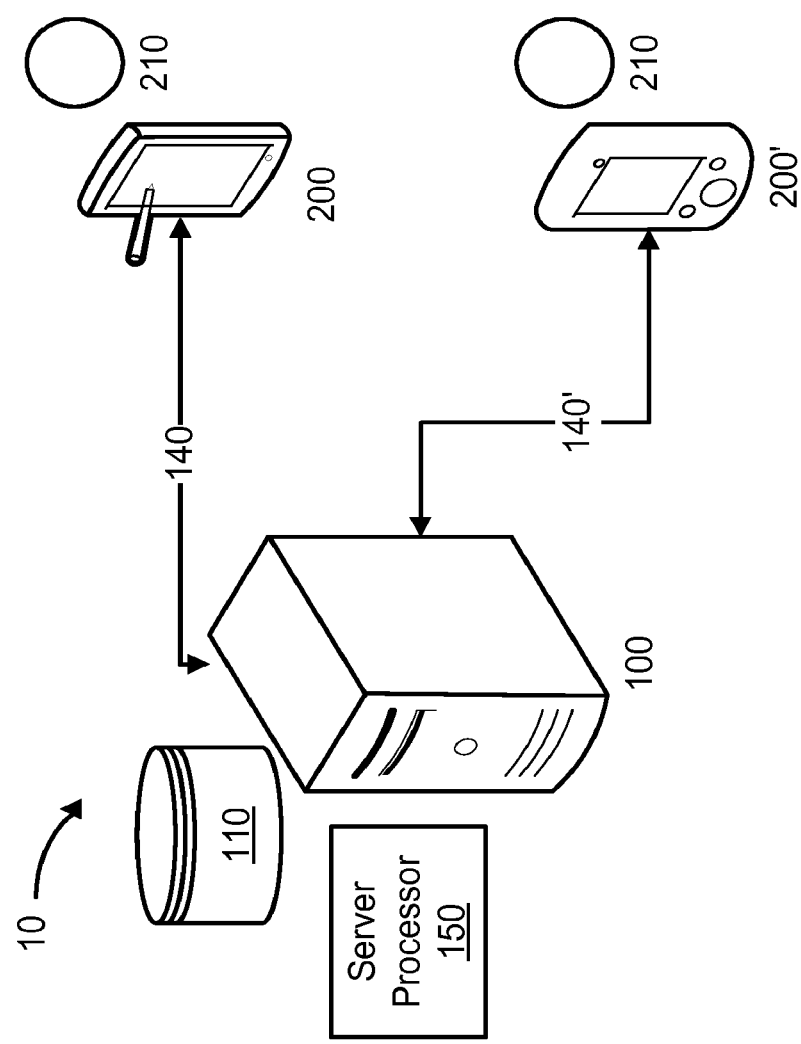
FIG. 1 is a block diagram illustrating a system for storing, viewing, and editing a document, according to an embodiment.

In more detail, FIG. 1 is a block diagram illustrating a system 10 for storing, viewing, and editing a document, according to an embodiment. The system 10 includes a server 100, a first client device 200, and a second client device 200'. The server 100 may include a document database 110 that stores documents and other files, and a server processor 150 that performs a Server Side Composition (SSC) process and a page rendering process. Although FIG. 1 shows that the server 100 includes one processor, in other embodiments, the server 100 may include any number of processors.

The first client device 200 and the second client device 200' are connected to the server 100 via first communication link 140 and second communication link 140', respectively. The first and second communication links 140 and 140' may include, for example, Wi-Fi, 3G networks, 4G networks, or other telecommunication networks known in the art. A document viewer and editor application 210 is installed on each of the first and second client devices 200 and 200'.

Although FIG. 1 shows two client devices, any number of client devices may be connected to the document server 100 and associated with the system 10. A client device may include a tablet PC, a mobile phone, a smart phone, a laptop, a computer terminal, and any other client devices known in the art. In the following, a single reference character may be used to represent multiple elements—for example, a "client device 200" may be referenced, but this could possibly include a first 200 and second 200' client device.

Figure 2:
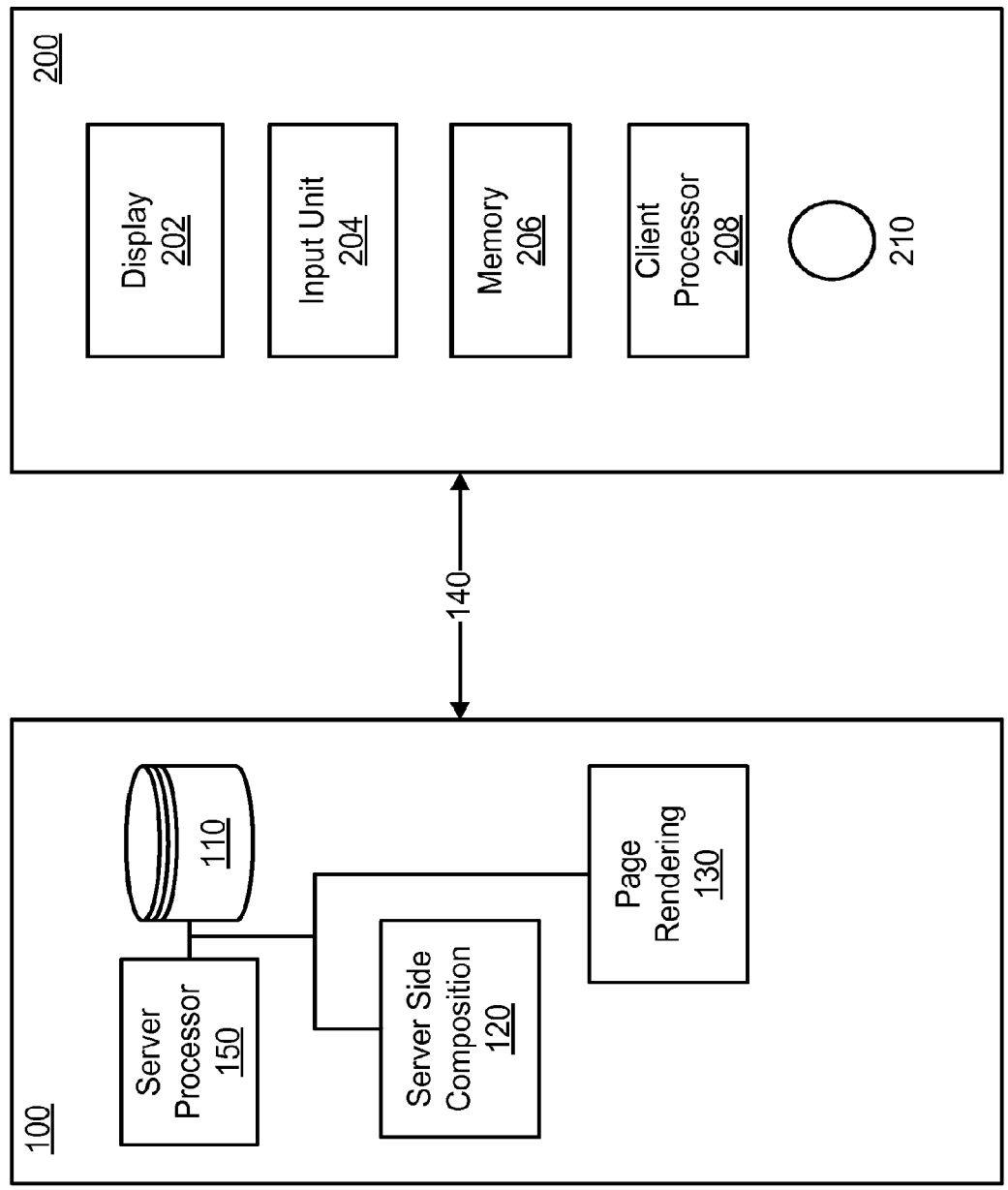
FIG. 2 is a block diagram illustrating the server and client device of FIG. 1.

FIG. 2 is a block diagram illustrating the server 100 and the client device 200 of FIG. 1. The server 100 includes a document database 110 that stores documents and other files, and a server processor 150 that perform a SSC process 120 and a page rendering process 130. The SSC process 120 and the page rendering process 130 will be discussed in more detail below with respect to FIGS. 4 and 5.

The client device 200 is connected to the server 100 via a first communication link 140. The client device 200 may include a display 202, an input unit 204, a memory 206, and a client processor 208. The display 202 may be, for example, a liquid crystal display (LCD), a LED-LCD, or other displays known in the art. The input unit 204 may be, for instance, a touch screen, a stylus, a keypad, a keyboard, or other input devices known in the art.

The document viewer and editor application 210 is installed on the client device 200. The document viewer and editor application 210 allows a user to access, download, view, and edit various documents stored in the document database 110 of the server 100. The document viewer and editor application 210 may be executed by the server processor 150 or the client processor 208, or both. The document viewer and editor application 210 may also include a user authentication feature, where the user is required to enter a username and password, or other credentials, before the user is permitted to access any documents stored on the document server 100.

Figure 3:
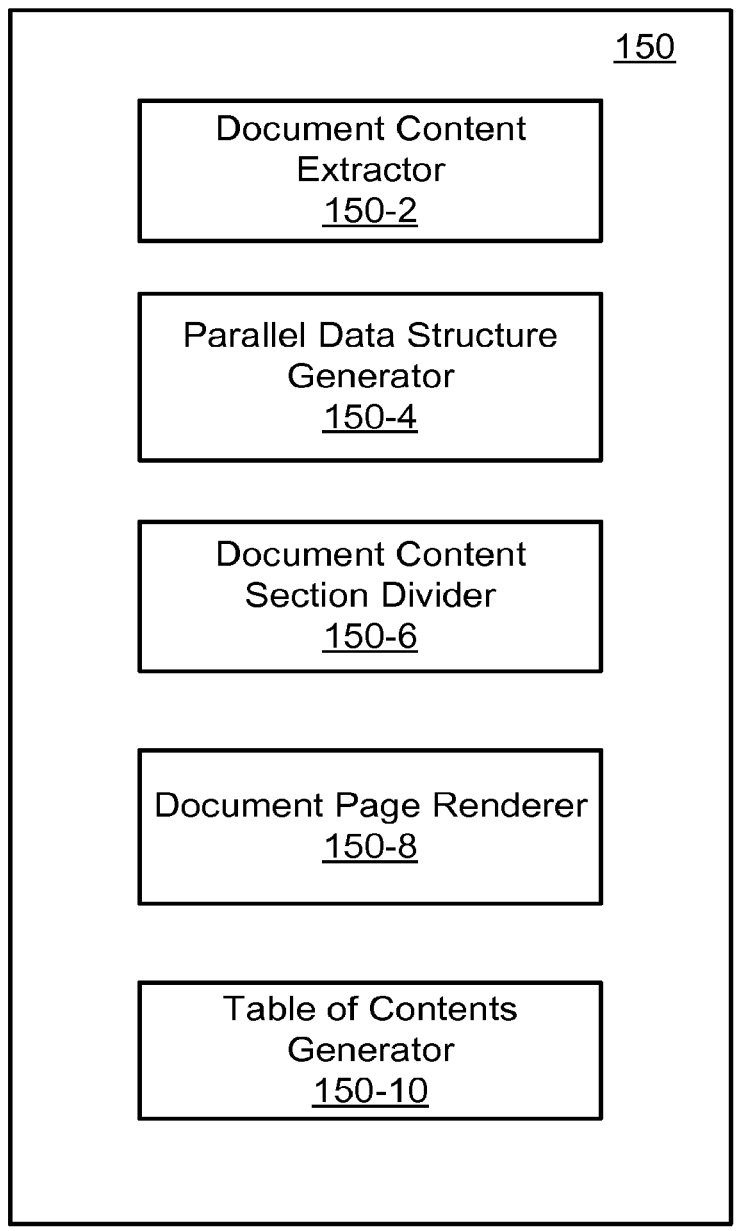
FIG. 3 is a block diagram illustrating components of a server processor, according to an embodiment.

FIG. 3 is a block diagram illustrating components of a server processor 150, according to an embodiment. The server processor 150 may include a document content extractor 150-2, a parallel data structure generator 150-4, a document content section divider 150-6, a document page renderer 150-8, and a table of contents generator 150-10. The document content extractor 150-2, the parallel data structure generator 150-4, and the document content section divider 150-6 may carry out the operations of the SSC process 120. The document page renderer 150-8 and the table of contents generator 150-10 may carry out the operations of the page rendering process 130.

Each component illustrated in FIG. 3 may be realized by any number of hardware and/or software components configured to perform the specified functions. Although the components are illustrated as a part of the server processor 150 in the present embodiment, the components may be separate and independent from the server processor 150 in other embodiments.

Figure 4:
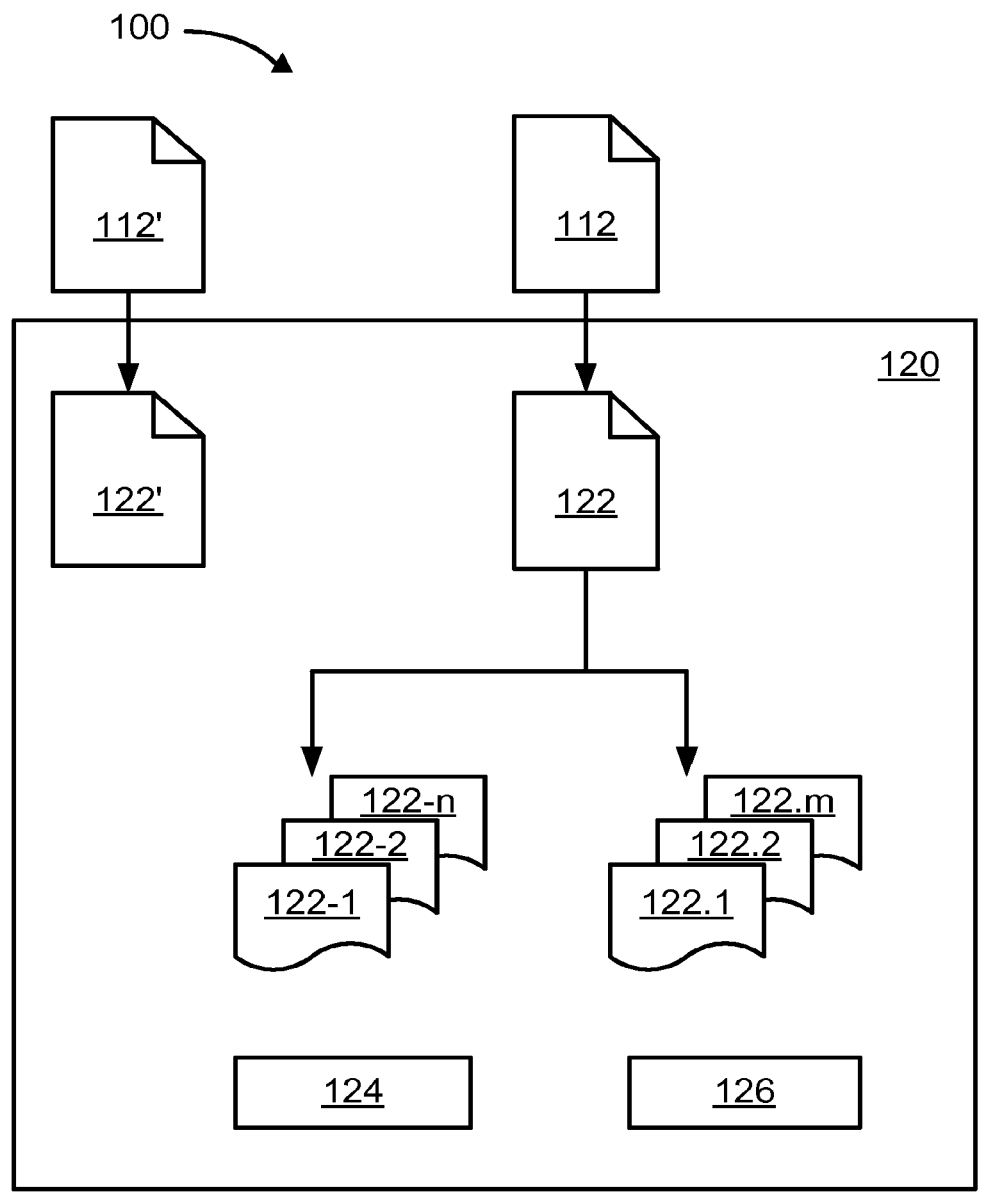
FIG. 4 is a block diagram illustrating a Server Side Composition (SSC) process in the server of FIG. 1.

FIG. 4 is a block diagram illustrating the Server Side Composition (SSC) process 120 in the server 100 of FIG. 1. A first document 112 and a second document 112' are stored in the document database 110. The first document 112 and the second document 112' are traditional document files that include both document content and document support data, such as pagination data and style data. In addition, there may be various versions or revisions of the first document 112 and the second document 112', which may also be stored in the document database 110. The SSC process 120 and the page rendering process 130 can be performed on any version of any document stored in the document database 110.

During the SSC process 120, the document content extractor 150-2 extracts first document content 122 from the first document 112. Similarly, the document content extractor 150-2 extracts second document content 122' from the second document 112'. First document content 122 and second document content 122' may each include a string of characters that represents the content of first document 112 and second document 112', respectively. For instance, in an embodiment, the first document 112 may be an XML file that includes both "content" and "markup," and the document content extractor 150-2 may parse out the XML file and extracts only the "content" of the XML file (e.g., a long string of characters that may represent text or may be references to images) as the first document content 122. The document content extractor 150-2 may also use or execute other content extraction techniques or algorithms known in the art.

Optionally, the SSC process may divide the document content into SSC document content sections. The number of SSC document content sections is arbitrary and may be set by a designer or determined using metadata. For instance, the document content may be only one SSC document content section. Furthermore, each SSC document content section may include document content that spans one or more pages based on a viewing size.

In the embodiment illustrated in FIG. 4, the document content section divider 150-6 divides the first document content 122 into first SSC document content section 122-1, second SSC document content section 122-2, up to n-th SSC document content section 122-*n*. Each of the first to n-th SSC document content section 122-1, 122-2, to 122-*n* includes only document content. Furthermore, each of the first to n-th SSC document content section 122-1, 122-2, to 122-*n* may include document content that spans one or more pages, where the page size will be specified by pagination selectors in a SSC parallel data structure. In addition, since the number of SSC document content sections is arbitrary, the document content section divider 150-6 may divide the first document content 122 into a second set of SSC document content sections 122.1, 122.2, to 122.*m*.

First document content 122 and second document content 122' may be displayed on various screen sizes or printed on various paper sizes. The various screen sizes and paper sizes are herein referred to as viewing sizes. During the SSC process 120, for a viewing size, the parallel data structure generator 150-4 may generate a SSC parallel data structure. An SSC parallel data structure may be an object, object graph, object diagram, an array, or other data structures known in the art. In some embodiments, the parallel data structure generator 150-4 may generate a SSC parallel data structure for a document content before the document content is divided into SSC document content sections. Alternatively, the parallel data structure generator 150-4 may generate a SSC parallel data structure for an SSC document content section or for a plurality of SSC document content sections.

In the embodiment illustrated in FIG. 4, two viewing sizes are provided. Accordingly, the parallel data structure generator 150-4 generates a first SSC parallel data structure 124 and a second SSC parallel data structure 126, each respectively correspond to a viewing size. The first SSC parallel data structure 124 and the second SSC parallel data structure 126 each may include a plurality of selectors. The plurality of selectors may include pagination or page selectors, format selectors, style selectors, link selectors, element selectors, and annotation selectors. Selectors differ based on what they are used for and based on the types of elements to which the selectors link.

Figure 11:
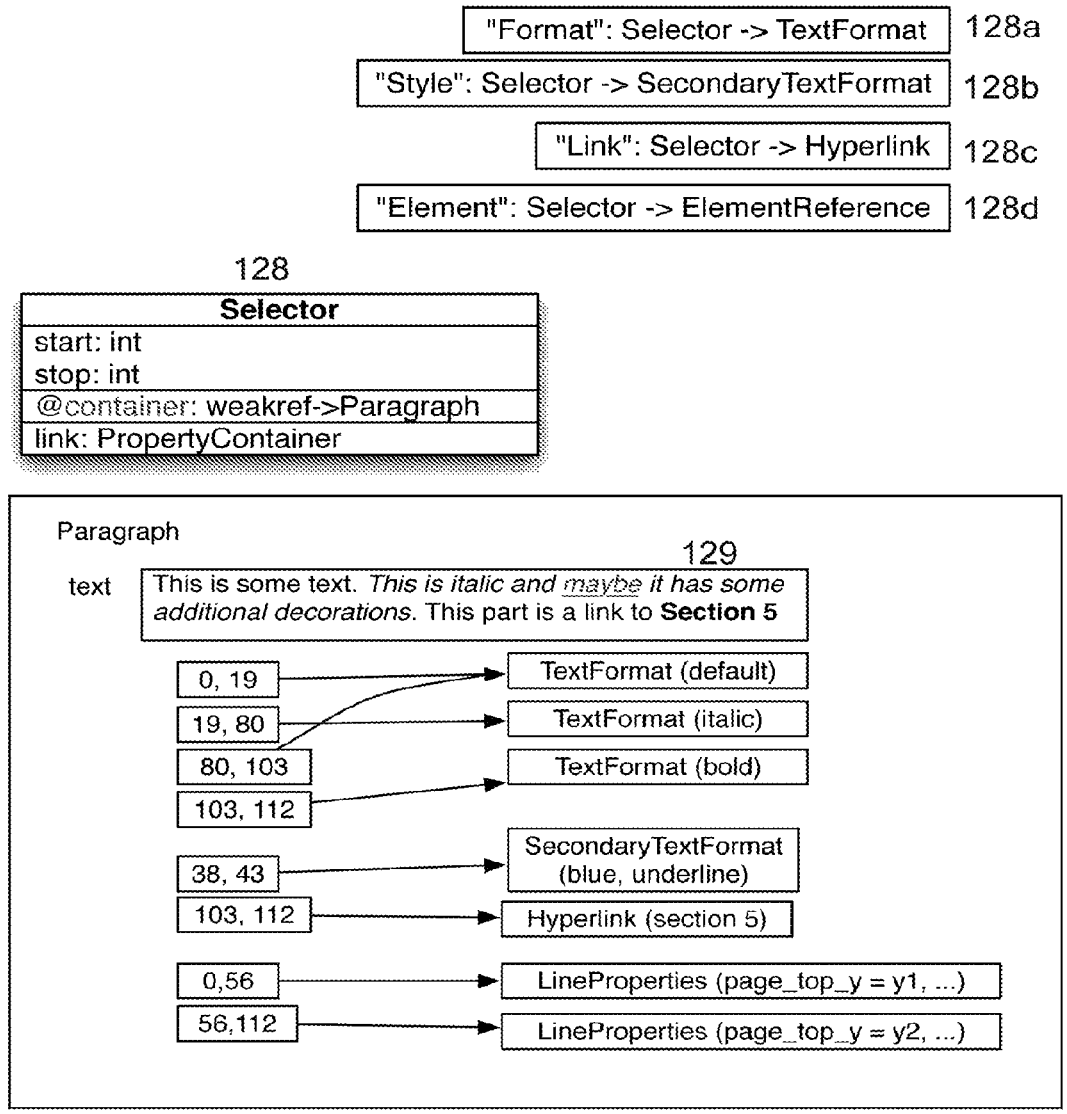
FIG. 11 is a block diagram illustrating various selectors and their relationship with sample text, according to an embodiment.

FIG. 11 illustrates various selectors 128a-128d and their relationships with sample text 129, according to an embodiment. In the current embodiment, format selector 128a, style selector 128b, link selector 128c, and element selector 128d are instances, which link different types of properties, and the type of the link value determines the purpose of the selector. Although the various selectors are instances in the current embodiment, in other embodiments, a selector may be a subclass, since a subclass provides a large number of convenience methods, which are specific to a particular meaning and link type.

The selectors 128a-128d may use selector syntax 128, which includes a start value, a stop value, and a link to a property type. In the present embodiment, the start value and the stop value in selector syntax 128 are integers that represent the starting and ending character positions in string of text content. The link to "PropertyContainer" is different for a different type of selectors. For example, the format selector 128a is linked to "TextFormat," the style selector 128b is linked to "SecondaryTextFormat," the link selector 128c is linked to "Hyperlink," and the element selector 128d is linked to "ElementReference."

The "TextFormat" property includes information required for all text, such as font family, font size, font weight, and font style. Every character has a TextFormat property, which includes values that are necessary for pagination. Selectors for TextFormat, for example, format selector 128a, may be stored in a separate property of paragraph or formats, which provides a tiling of all text in the paragraph. This configuration improves efficiency of text measuring functions used during pagination. In addition to pagination efficiency, using smaller groupings of property for format allows the use of fewer total unique format specifiers, which improves memory efficiency.

On the other hand, the "SecondaryTextFormat" property is not needed for pagination. SecondaryTextFormat may include text color, background color, underline, and other text attributes. Unlike TextFormat, SecondaryTextFormat may apply to only some text. Furthermore, the types of properties linked by the selectors are not limited to those illustrated in FIG. 11, and may include paragraph, section, page, document, page layout, text box, and other types of properties known in the art.

Also illustrated in FIG. 11 is sample text 129. The sample text 129 includes text content and format, style, link, and line data. Using the selectors 128a-128d, the format, style, link, and line data of the sample text 129 may be separately expressed from the text content of the sample text 129. For example, the sample text 129 is associated with four format selectors 128a, one style selector 128b, and one link selector 128c. The sample text 129 is also associated with two line selectors 128e, which are subclass selectors. The line selector 128e provides methods such as "place_in_box," which are only meaningful for a unit of text which has a certain height, width, and alignment. This is only applicable to a line, but not, for example, to a hyperlink.

In the embodiment illustrated in FIG. 4, the first SSC parallel data structure 124 includes pagination selectors that indicate how to break the first document content 122 into 8"×11" sized pages, and the second SSC parallel data structure 126 includes pagination selectors that indicate how to break the first document content 122 into 11"×14" sized pages, as shown in Table 1 below. Furthermore, in an embodiment, the syntax of the pagination selector may be as follows, "selector: start, end, payload."

TABLE 1

| SSC Parallel Data Structure 124 Pagination Data: 8" × 11" | SSC Parallel Data Structure 126 Pagination Data: 11" × 14" |
|---|---|
| selector: 0, 500, {page} | selector: 0, 300, {page} |
| selector: 1, 1000, {page} | selector: 1, 600, {page} |

Furthermore, for the same document content, the SSC process 120 may generate or create a plurality of SSC parallel data structures, where each SSC parallel data structure corresponds to a viewing size of a plurality of viewing sizes. Moreover, in other embodiments, the parallel data structure generator 150-4 may generate a SSC parallel data structure for each SSC document content section. For example, the parallel data structure generator 150-4 may generate five SSC parallel data structures to correspond to five SSC document content sections, where each SSC document content section is associated with a respective SSC parallel data structure.

To enhance the security of the document, each SSC parallel data structure and each SSC document content section may be separately encrypted and stored in separate locations in the server. For example, in FIG. 4, the first SSC parallel data structure 124 may be encrypted and stored on a first location on the server 100 separately from the first to n-th SSC document content sections 122-1, 122-2, to 122-n. In turn, each of the first to n-th SSC document content sections 122-1, 122-2, to 122-n may be individually encrypted and stored on various other locations on the server 100. This encryption and storage configuration severs the links between the first SSC parallel data structure 124 and each of the first to n-th SSC document content sections 122-1, 122-2, to 122-n. This configuration also severs the links among the first to n-th SSC document content sections 122-1, 122-2, to 122-n. Consequently, unauthorized access into the first SSC document content section 122-1, for example, would not necessarily lead to the remaining second to n-th SSC document content sections 122-2 to 122-n. And it would be difficult to piece the first to n-th SSC document content sections 122-1 to 122-n back together to recreate the first document 112. The encryption may be any encryption technique known in the art.

In other embodiments, to enhance the performance of the system, selectors from an SSC parallel data structure that are associated with an SSC document content section may be stored together with the SSC document content section. For instance, selectors for the first SSC document content section 122-1 would be stored with the first SSC document content section 122-1, and selectors for the n-th SSC document content section 122-*n* would be stored with the n-th SSC document content section 122-*n*. Then, each SSC document content section may be separately encrypted and stored in separate locations in the server.

Figure 5:
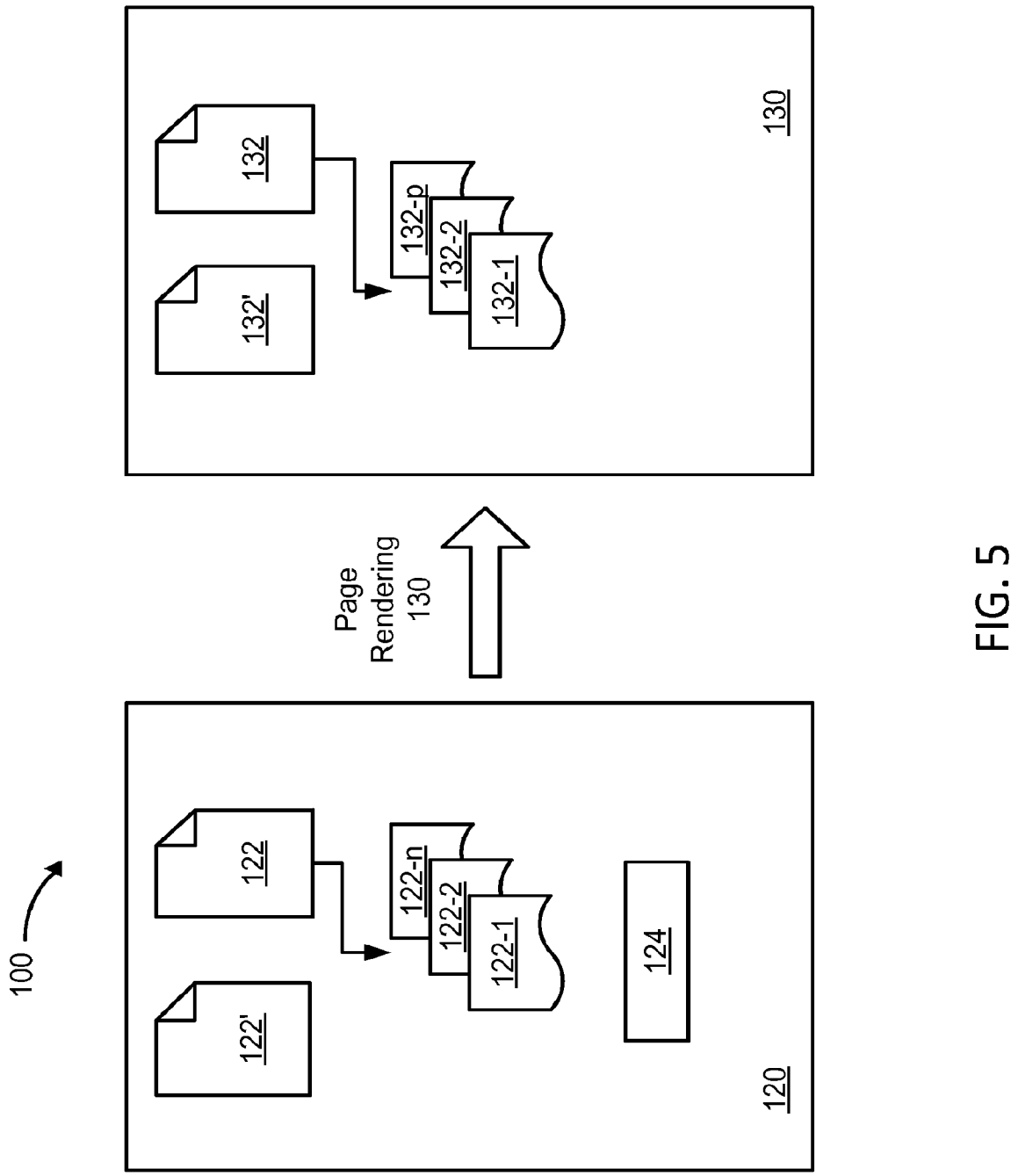
FIG. 5 is a block diagram illustrating a page rendering process in the server of FIG. 1.

FIG. 5 is a block diagram illustrating the page rendering process 130 in the server 100 of FIG. 1. According to the pagination selectors in the first SSC parallel data structure 124, a table of contents generator 150-10 generates a table of contents 132. Then, according to the plurality of selectors in the first SSC parallel data structure 124, a document page renderer 150-8 renders the first to n-th SSC document sections 122-1, 122-2, to 122-*n* into first to p-th document pages 132-1, 132-2, to 132-*p*. As discussed previously, each of the first to n-th SSC document content sections 122-1, 122-2, to 122-*n* may include document content that spans one or more pages. Therefore, the number of rendered document pages (p) generated during the page rendering process 130 does not necessarily equal the number of SSC document sections (n) generated during the SSC process 120. In other embodiments, the document page renderer 150-8 may render a document content into a plurality of document pages, if the document content is not divided into SSC document content sections.

Figure 6:
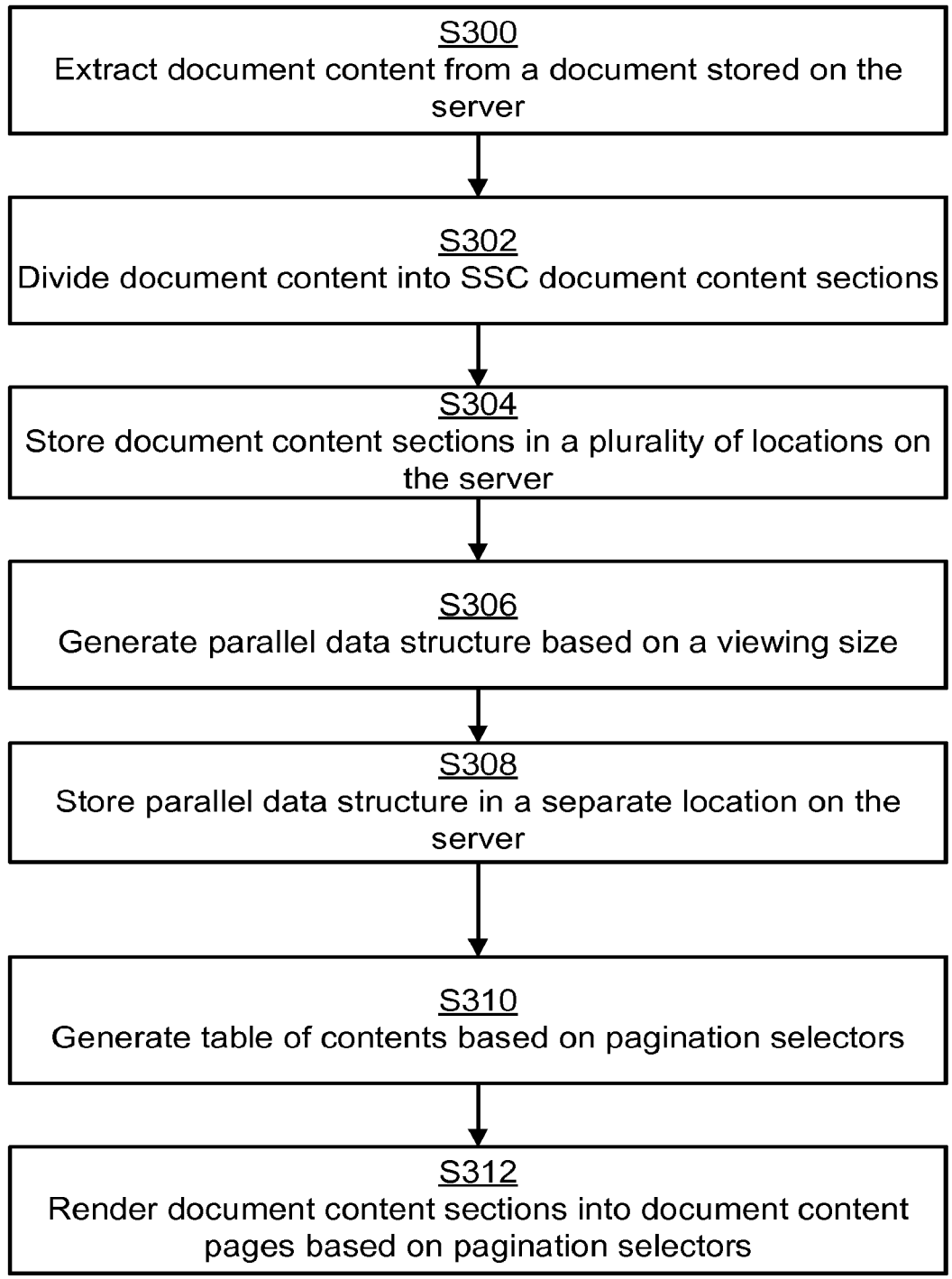
FIG. 6 is a flowchart illustrating an SSC process and a page rendering process in a server, according to an embodiment.

FIG. 6 is a flowchart illustrating the SSC process 120 and the page rendering process 130 on the server 100, according to an embodiment. Steps S300 to S308 illustrate the SSC process 120. In step S300, a document content extractor 150-2 extracts document content from a document stored on the server 100. In step S302, a document content section divider 150-6 divides or breaks the document content into a plurality of SSC document content sections. The plurality of SSC document content sections is then stored in a plurality of locations on the server 100, where each SSC document content section may be stored in a separate location (step S304). Optionally, step S302 may be omitted if the document content includes only one SSC document content section. Steps S302 and S304 may be omitted if the document content is not divided into SSC document content sections.

In step S306, for a viewing size, a parallel data structure generator 150-4 generates or creates an SSC parallel data structure for the plurality of SSC document content sections. The SSC parallel data structure includes a plurality of selectors, such as pagination selectors, format selectors, style selectors, and link selectors. The SSC parallel data structure is then stored in a location on the server 100 separate from the plurality of locations in which the plurality of SSC document content sections are stored (step S308).

Steps S310 and S312 illustrate the page rendering process 130. In step S310, a table of contents generator 150-10 generates a table of contents for the document content according to the pagination selectors in the SSC parallel data structure. The table of contents is then stored on the server 100. In step 312, a document page renderer 150-8 renders the plurality of SSC document content sections into a plurality of document pages according to the plurality of selectors in the SSC parallel data structure. The rendered document content pages are then stored on the server 100.

Although the table of contents is generated before the rendering of the document pages in the current embodiment, the table of contents may be generated simultaneously or after the rendering of document pages. In the latter embodiments, the table of contents generator may generate the table of contents based on the rendered document pages. Furthermore, a blank or generic table of contents may be generated and stored on the server prior to the page rendering process, and the blank table of contents may be filled in once the page rendering process begins. In yet other embodiments, for each viewing size of a plurality of viewing sizes, a table of contents may be generated and a plurality of document pages may be rendered, using the same document content. Optionally, the table of contents and each of the rendered document pages may be separately encrypted and/or stored.

In the present embodiment, the table of contents 132 is generated and the first to p-th document pages 132-1, 132-2, to 132-*p* are rendered directly after the first to n-th SSC document content sections 122-1, 122-2, to 122-*n* are generated. Alternatively, in other embodiments, the table of contents, the document pages, or both, may be non-persistent. In other words, the table of contents is generated and the document content pages are rendered only after the server 100 receives a request to view the document from a client device.

Figure 7:
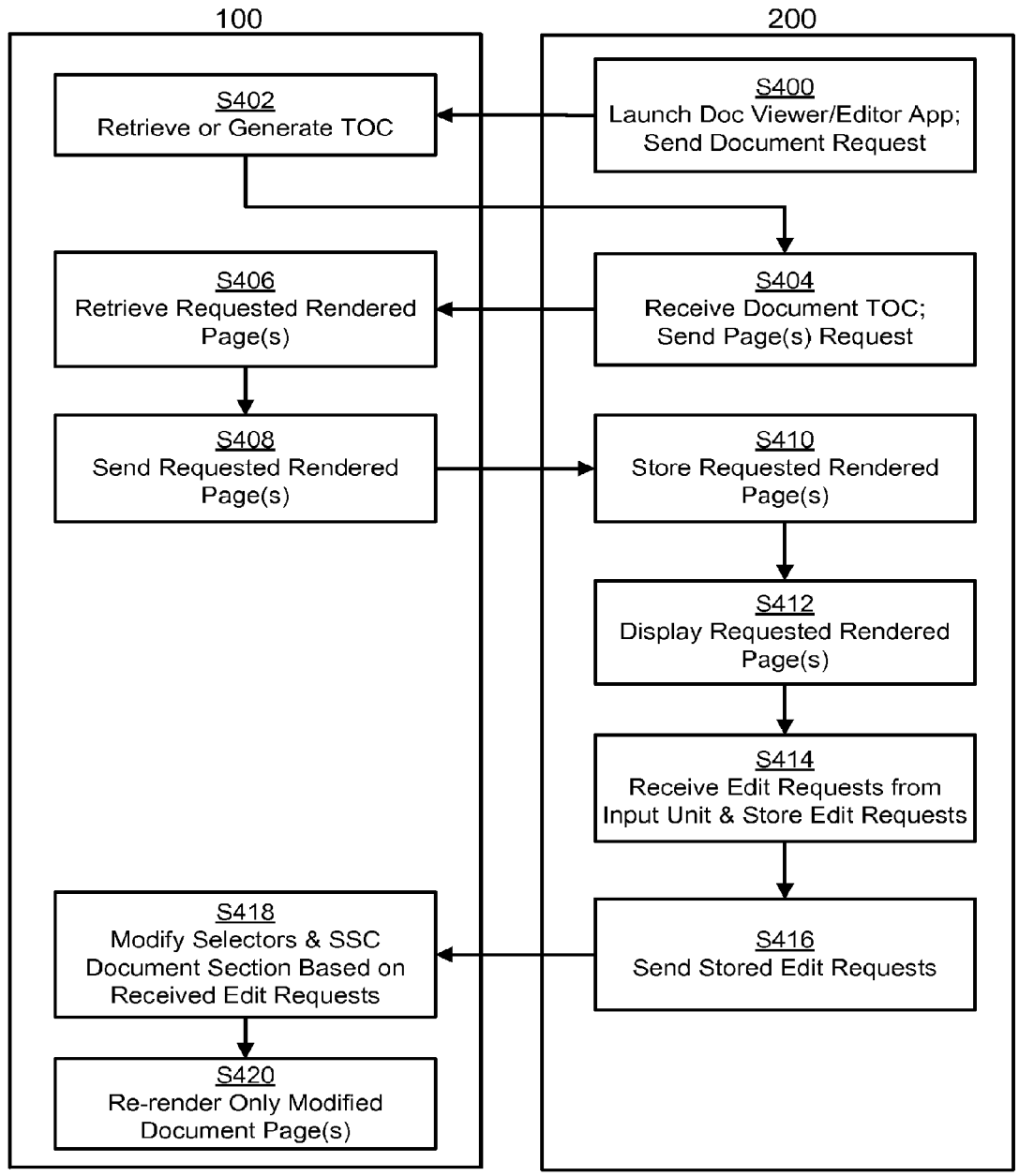
FIG. 7 is a flowchart illustrating a method for viewing and editing a portion of a document, according to an embodiment.

FIG. 7 is a flowchart illustrating a method for viewing and editing a portion of a document, according to an embodiment. In step S400, a user launches the document viewer and editor application 210 on the client device 200. The client device 200 establishes a connection with the server 100. Then, the user may select a document, such as the first document 112, using the document viewer and editor application 210. In step S402, after receiving the document request from the client device 200, the server 100 retrieves the table of contents 132 associated with the first document 112. If the table of contents 132 had not been generated prior to the document request, the server 100 may then generate the table of contents 132 through the SSC process 120 and page rendering process 130 as previously discussed.

In an embodiment, the document viewer and editor application 210 may prompt the user to enter authentication information, such as a username and password, before the user can send a document request. After the user has entered the authentication information in the document viewer and editor application 210, the client device 200 sends the user authentication information to the server 100. Once the server 100 verifies that the received user authentication information is correct, the user may then request documents from the server 100 via the document viewer and editor application 210.

In the embodiment illustrated in FIG. 7, the user may wish to view and/or edit only a portion of a document, for example, pages 20 to 22 of the first document 112 stored on the server 100. In step S404, the document viewer and editor application 210 receives the table of contents 132 from the server 100 and displays the table of contents 132 on the client display 202. The user can then select pages 20 to 22 from the displayed table of contents 132. Once the page selection is made, the client device 200 sends a page request for pages 20 to 22 to the document server 100.

In step S406, the document server 100 receives the page request for pages 20 to 22. In an embodiment, the server 100 may retrieve only the requested pages, such as the requested pages 20 to 22. In another embodiment, the server 100 may retrieve the requested pages and a predetermined number of pages (e.g., 3) that precede and follow the requested pages, since the user may wish to view or edit content in the vicinity of the requested pages. In this case, the server 100 would not only retrieve requested pages 20 to 22, but also retrieve rendered pages 17 to 19 and rendered pages 23 to 25. Then in step S408, the server 100 sends the rendered pages 17 to 25 to the client device 200. In some embodiments, the predetermined number of pages may be preset by the server 100 or the client device 200. In other embodiments, the predetermined number of pages may be determined dynamically based on the amount of memory available on the client device 200.

In step S410, the client device 200 receives the rendered pages and stores them in the memory 206. Next, in step S412, the document viewer and editor application 210 on the client device 200 displays the requested pages 20 to 22 on the display 202 one page at a time or multiple pages at a time. Once the requested pages are displayed, the user may make edits to the pages using the input unit 204 on the client device 200. In step S414, the client device 200 receives the user's edit requests and stores the edit requests in the client device memory 206. The client device 200 may also display the edit requests (e.g., user mark-ups of the document) on the display 202 so that the user can view the mark-ups in real time.

In step 416, the client device 200 sends the stored edit requests to the server 100. If the client device 200 has maintained the connection with the server 100 during the editing session, the client device 200 may send the edit requests to the server 100 in real time. However, if the client device 200 is offline, or no longer connected to the document server 100, the client device 200 may save the edit requests in the client device memory 206 and send the accumulated edit requests to the server 100 once the first communication link 140 between the client device 200 and the server 100 is reestablished. In other word, when the client device 200 is offline, the edit requests are stored in the client device memory 206 and synced with the server 100 when the client device 200 is back online.

Once the server 100 receives the edit requests transmitted from the client device 200, the server 100 modifies only the associated selectors in the SSC parallel data structure and the associated SSC document content section that correspond to the pages indicated in the received edit requests (step S418). If the edit requests include adding or deleting a page, the parallel data structure generator 150-4 may regenerate the entire SSC parallel data structure or may regenerate only the selectors affected by the edit requests. Then in step S420, the document page renderer 150-8 re-renders only the modified document pages. Furthermore, the table of contents generator 150-10 may regenerate the entire table of contents or only the modified portion of the table of contents.

Figure 8:
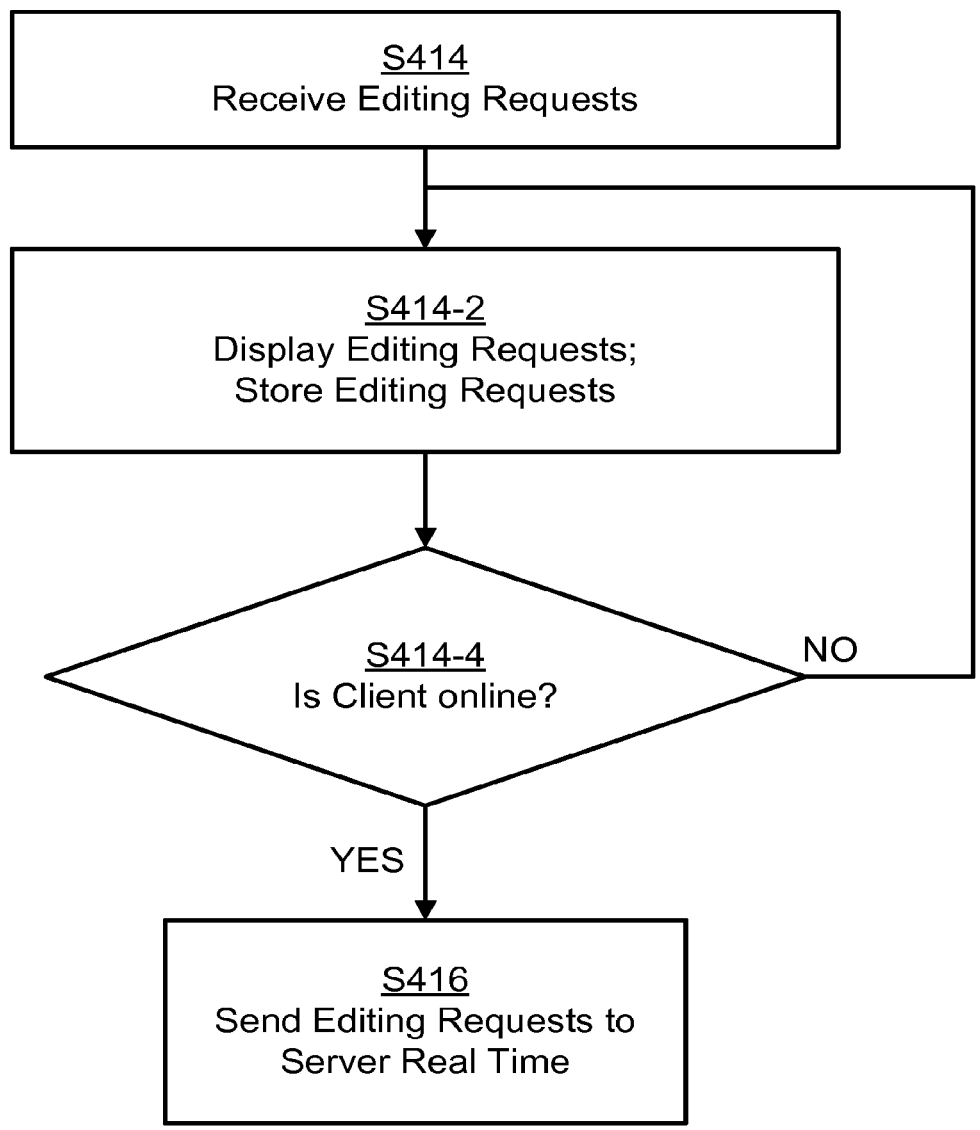
FIG. 8 is a flowchart illustrating a method for storing editing requests on a client device, according to an embodiment.

FIG. 8 is a flowchart illustrating a method for storing edit requests on a client device 200, according to an embodiment. As discussed with respect to FIG. 7, in step S414, the client device 200 receives the user's edit requests. In step S414-2, the client device 200 displays the user edits on the display 202 and stores the edit requests in the client device memory 206. Then in step S414-4, the client device 200 determines whether there is a connection between the client device 200 and the server 100. If the client device 200 has maintained the connection to the server 100 (YES), the client device 200 may send the stored edit requests to the document server 100 in real time (step S416). If the client device 200 is offline (NO), or no longer connected to the document server 100, the client device 200 may continue to save the edit requests in the client device memory 206 (step S414-2). In step S416, once the first communication link 140 between the client device 200 and the document server 100 is reestablished, the client device 200 transmits the accumulated edit requests to the server 100.

Figure 9:
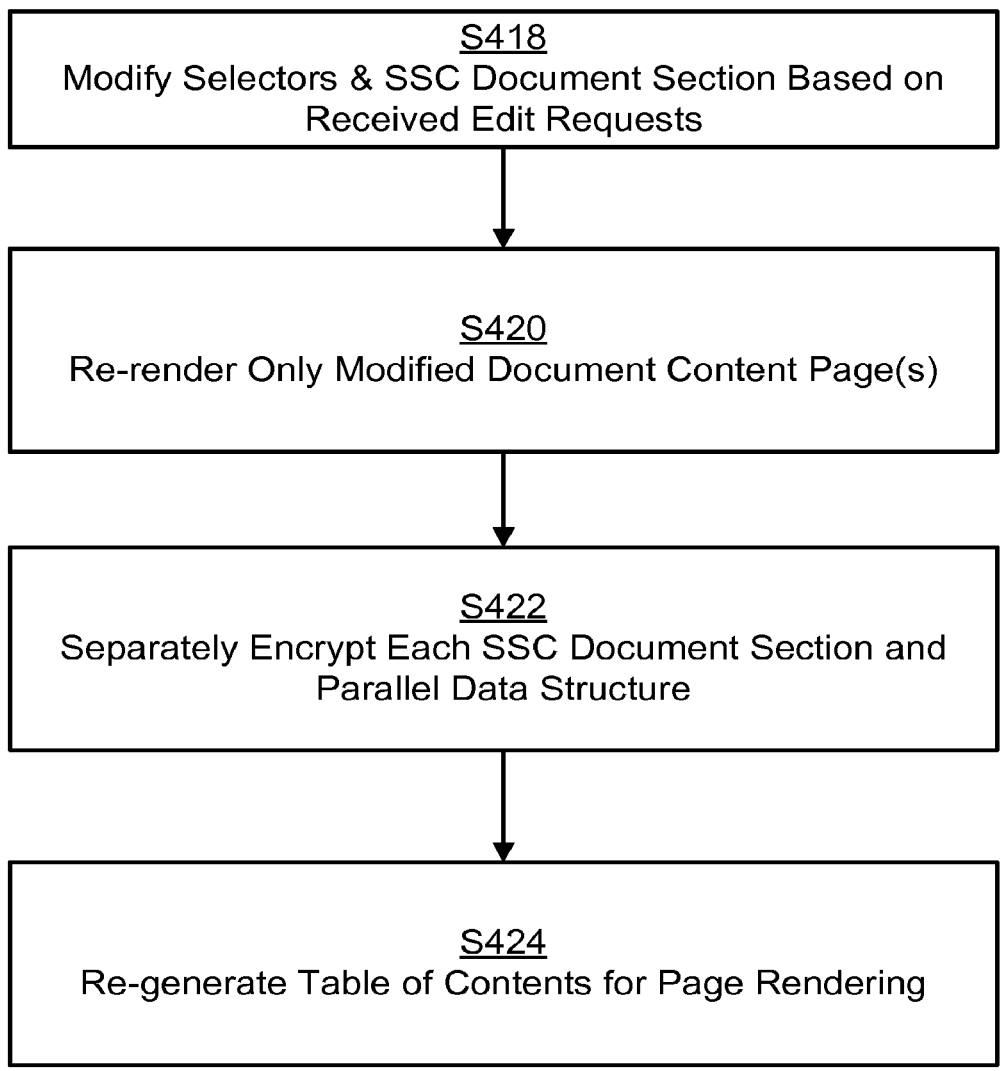
FIG. 9 is a flowchart illustrating a method for editing and encrypting sections of a document on a document server, according to an embodiment.

FIG. 9 is a flowchart illustrating a method for editing and encrypting SSC document content sections on the server 100, according to an embodiment. As discussed previously, once the server 100 receives the edit requests transmitted from the client device 200, the server 100 modifies only the associated SSC document content section and the associated selectors in the SSC parallel data structure that correspond to the modified pages indicated in the received edit requests (step S418). In step S420, the document content page renderer 150-8 re-renders only the modified document content pages. In step S422, the server 100 separately encrypts the modified SSC document section or sections and the associated regenerated SSC parallel data structure. Optionally, in step S424, the table of contents generator 150-10 may regenerate the table of contents and the document page renderer 150-8 may re-render the modified pages.

In other embodiments, the document viewer and editor application 210 on the client device 200 may also allow a user to scroll through portions of a document or an entire document. In this case, the user activates a scrolling function using the input unit 204, which may include a key input, a gesture on a touchscreen, or other scrolling inputs known in the art. While the user is scrolling through the document, the document viewer and editor 210 delays the transmission of page requests for a predetermined period of time (e.g., a fraction of a second), to allow the user to scroll to a desired page. After the predetermined period of time has elapsed, the document viewer and editor application 210 determines whether the scrolling function is still activated (i.e., whether the user is still scrolling through the document). If the document viewer and editor application 210 determines that the scrolling function is deactivated or no longer activated, the document viewer and editor application 210 then sends a page request for the destination page. If the document viewer and editor application 210 determines that the scrolling function is still activated, then document viewer and editor application will delay the transmission of page requests for another predetermined period of time. Accordingly, the document viewer and editor application 210 may allow a user to rapidly scroll through an entire document, which may include thousands of pages, in just a few seconds.

Figure 10:
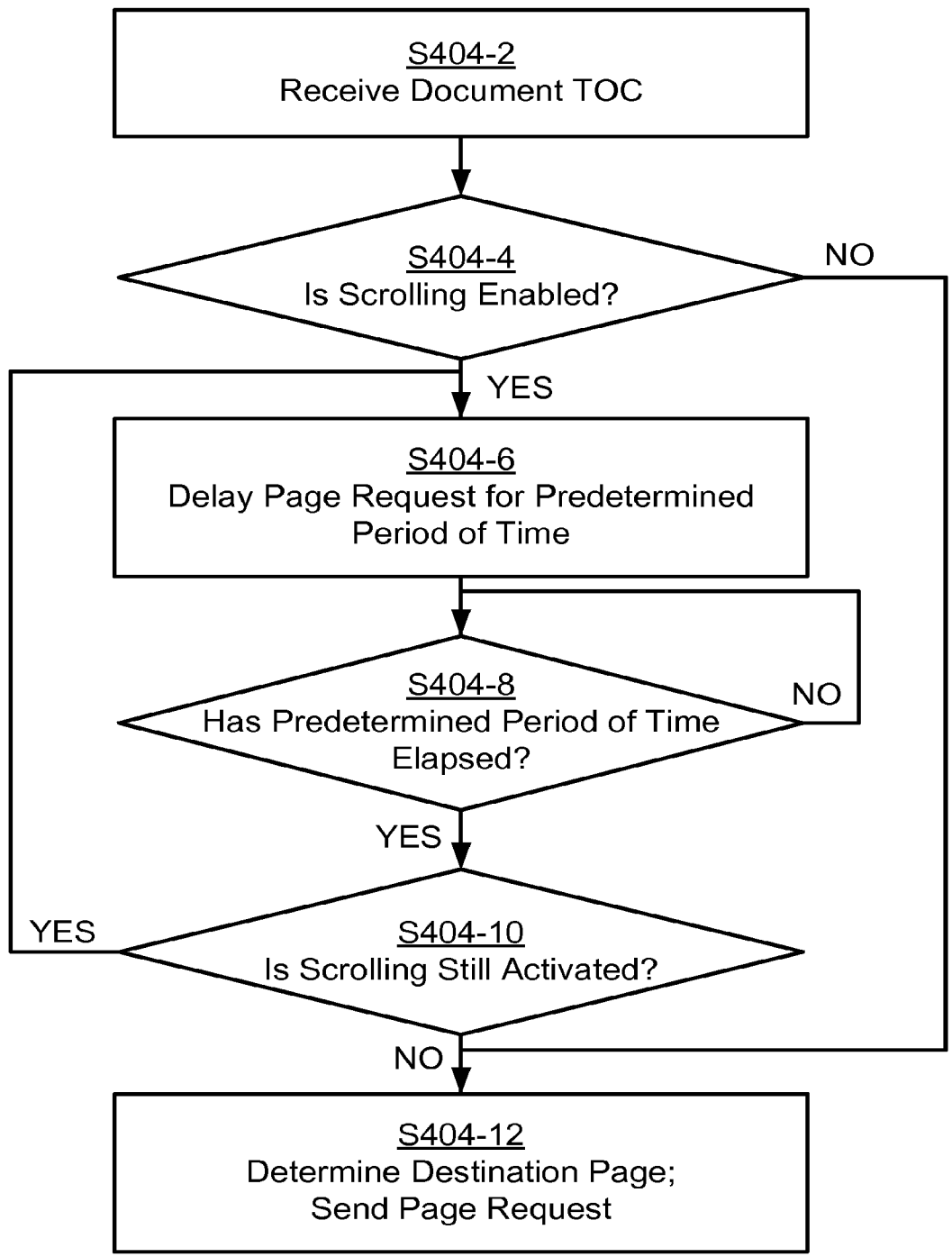
FIG. 10 is a flowchart illustrating a page request by a client device when a scrolling function is activated, according to an embodiment.

FIG. 10 is a flow chart illustrating a page request by a client device 200 when a scrolling function is activated, according to an embodiment. In step S404-2, the document viewer and editor application 210 receives a table of contents from the server 100 and displays the table of contents on the client display 202. In S404-4, the document viewer and editor application 210 determines whether a scrolling function is enabled. If the scrolling function is not enabled (NO), then the document viewer and editor application 210 may wait for the user to select a page from the table of contents and send the page request in step S404-12. If the document viewer and editor application 210 determines that the scrolling function is enabled (YES), then in step S404-6, the document viewer and editor application 210 delays the transmission of page requests for a predetermined period of time (e.g., a fraction of a second), to allow the user to scroll to a desired page. In step S404-8, the document viewer and editor 210 determines whether the predetermined period of time has elapsed. In the current embodiment, the document viewer and editor application 210 will not proceed to the next step until the predetermined period of time has elapsed (NO). After the predetermined period of time has elapsed (YES), the document viewer and editor application 210 determines whether the scrolling function is still activated in step S404-10. If the document viewer and editor application 210 determines that the scrolling function is deactivated (NO), the document viewer and editor application 210 first determines the destination page and then sends a page request for the destination page in step S404-12. The page of the document to which the user has scrolled to or the page that the user has stopped at is the destination page. If the document viewer and editor application 210 determines that the scrolling function is still activated (NO), then document viewer and editor application 210 will delay the transmission of page requests for another predetermined period of time (step S404-6).

In some embodiments, the predetermined amount of time for which the document viewer and editor application delays the transmission of page requests may be preset by the client device. In other embodiments, the predetermined amount of time may be determined by the client device based on the amount of memory available on the client device.

Furthermore, in some embodiments, the parallel data structure generator 150-4 may generate an interdocument linking parallel data structure in addition to the SSC parallel data structure. The interdocument linking parallel data structure may include selectors that provide links for various document contents (e.g., pages, sections, chapters, tables, images, etc.) within the document. For instance, section one of a document may be linked to section ten of a document. In this case, the interdocument linking parallel data structure may include a selector that delineates the link between section one and section ten. The interdocument linking parallel data structure may be a separate data structure from the SSC parallel data structure. Alternatively, the interdocument linking parallel data structure may be a sub-data structure within the SSC parallel data structure.

In yet other embodiments, when a new version or revision of a document is created, the table of contents generator 150-10 may generate a table of contents that links to both the previous version and the current version of the document. Alternatively, instead of regenerating the table of contents when a portion of the document is modified, the table of contents generator 150-10 may modify only the portion of the table of contents that is linked to the modified portion of the document.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

TABLE OF REFERENCE CHARACTERS

| Ref. Character | Element |
| --- | --- |
| 100 | Server |
| 110 | Document Database |
| 112, 112' | First Document, Second Document |
| 120 | Server Side Composition (SSC) Process |
| 122, 122' | First Document Content, Second Document Content |
| 122-1 . . . 122-n | First to N-th SSC Document Content Sections |
| 122.1 . . . 122.m | Second Set of SSC Document Content Sections |
| 124, 126 | First SSC Parallel Data Structure, Second SSC Parallel Data Structure |
| 128 | Selector Syntax |
| 128a, 128b, 128c, | Format Selector, Style Selector, Link Selector, |
| 128d, 128e | Element Selector, Line Selector |
| 129 | Sample Text |
| 130 | Page Rendering Process |
| 132, 132' | Table of Contents |
| 132-1 . . . 132-p | Rendered Document Pages |
| 140, 140' | First Communication Link, Second Communication Link |
| 150 | Server Processor |
| 150-2 | Document Content Extractor |
| 150-4 | Parallel Data Structure Generator |
| 150-6 | Document Content Section Divider |
| 150-8 | Document Page Renderer |
| 150-10 | Table of Contents Generator |
| 200, 200' | First Client Device, Second Client Device |
| 202 | Client Device Display |
| 204 | Client Device Input Unit |
| 206 | Client Device Memory |
| 210 | Client Viewer/Editor Application |

What is claimed is:

1. A method of storing a document on a server, comprising:
   extracting document content from a document stored on the server, using a processor on the server;
   dividing the document content into a plurality of document content sections;
   generating a parallel data structure for the plurality of document content sections based on a viewing size, wherein the parallel data structure comprises a plurality of selectors, and the plurality of selectors comprises pagination selectors; and
   storing the plurality of document content sections in a plurality of locations on the server.

2. The method of storing a document server according to claim 1, further comprising:
   storing the parallel data structure in a location on the server separate from the plurality of locations in which the plurality of document content sections are stored.

3. The method of storing a document on a server according to claim 1, further comprising:
   generating a table of contents based on the pagination selectors in the parallel data structure; and
   storing the table of contents on the server.

4. The method of storing a document on a server according to claim 3, further comprising:
   rendering the plurality of document content sections into a plurality of document pages based on the plurality of selectors in the parallel data structure; and
   storing the plurality of document pages on the server.

5. The method of storing a document on a server according to claim 1, further comprising:
   encrypting each document content section of the plurality of document content sections prior to the storing of the plurality of document content sections.

6. The method of storing a document on a server according to claim 1, wherein the plurality of selectors further comprises a selector selected from the group consisting of a format selector, a style selector, a link selector, a line selector, and an annotation selector.

7. The method of storing a document on a server according to claim 1, further comprising:
   receiving a request to remotely access a portion of the document stored on the server; and
   authenticating the request.

8. A method comprising:
   extracting content of a document, using a processor;
   dividing the extracted content into a plurality of document content sections based on metadata of the document;
   generating a parallel data structure for the plurality of document content sections based on a viewing size, wherein the parallel data structure comprises pagination selectors; and
   wherein at least one pagination selector is associated with a document content section of the plurality of document content sections.

9. The method of claim 8, further comprising:
   storing the document content section and the associated at least one pagination selector in the same location.

10. The method of claim 8, further comprising:
    storing the document content section and the associated at least one pagination selector in different locations.

11. The method of claim 8, wherein the document content section comprises at least one document page having the viewing size.

12. The method of claim 11, further comprising:
    rendering the document content section into the at least one document page according to the associated at least one pagination selector.

13. The method of claim 8, further comprising:
    generating a table of contents for the plurality of document content sections based on the pagination selectors in the parallel data structure.

14. The method of claim 8, further comprising:
    receiving a request to view a page of the document; and
    rendering a document content section, which includes content of the requested page, into at least one document page having the viewing size according to at least one pagination selector associated with the document content section.

15. The method of claim 14, further comprising:
    transmitting only the requested page and a predetermined number of rendered pages preceding and following the requested page.

16. The method of claim 8, further comprising:
    receiving a document editing request;
    updating the parallel data structure based on the received document editing request; and
    modifying only document content sections corresponding to the received document edit request.

17. The method of claim 16, wherein the updating of the parallel data structure comprises:

modifying only pagination selectors that correspond to the modified document content sections.

18. A method comprising:

extracting content of a document, using a processor;

dividing the extracted content into a plurality of document content sections based on metadata of the document; and generating a plurality of parallel data structures for the plurality of document content sections based on a viewing size, wherein:
- each parallel data structure of the plurality of parallel data structures corresponds to a document content section of the plurality of document content sections based; and
- each parallel data structure comprises pagination selectors associated with the corresponding document content section.

19. The method of claim 18, further comprising:

storing a document content section and its corresponding parallel data structure in the same location.

20. The method of claim 18, further comprising:

storing a document content section and its corresponding parallel data structure in different locations.

21. The method of claim 18, further comprising generating a table of contents for a document content section of the plurality of document content sections based on its corresponding parallel data structure.

22. A server comprising:

a memory configured to store a document, wherein the document comprises content and metadata; and a processor configured to:
- extract content of the document;
- divide the extracted content into a plurality of document content sections based on the metadata; and
- generating a parallel data structure for the plurality of document content sections based on a viewing size, wherein the parallel data structure comprises pagination selectors;

wherein at least one pagination selector is associated with a document content section in the plurality of document content sections.

23. The server of claim 22, wherein:

the document content section comprises at least one document page having the viewing size; and the processor is further configured to render the document content section into the at least one page document according to the associated at least one pagination selector.

* * * * *